United States Patent [19]

Verbandt

[11] 4,353,797
[45] Oct. 12, 1982

[54] DEVICE FOR PURIFYING LIQUIDS, PARTICULARLY WATER

[76] Inventor: André Verbandt, 130, Parmentierlaan, Knokke, Belgium

[21] Appl. No.: 240,975

[22] Filed: Mar. 5, 1981

[30] Foreign Application Priority Data

Mar. 13, 1980 [BE] Belgium .............................. 199787

[51] Int. Cl.³ .............................................. B01D 35/16
[52] U.S. Cl. .................................................. 210/159
[58] Field of Search ................ 210/159, 162, 407, 413

[56] References Cited

U.S. PATENT DOCUMENTS

| | | | |
|---|---|---|---|
| 2,335,573 | 11/1943 | Scott | 210/159 |
| 2,904,181 | 9/1959 | Baher et al. | 210/159 |
| 3,615,012 | 10/1969 | Verbandt | 210/159 |
| 4,277,335 | 7/1981 | Hori | 210/159 |

Primary Examiner—Ivars C. Cintins
Attorney, Agent, or Firm—Wegner, McCord, Wood & Dalton

[57] ABSTRACT

There is described a device for purifying liquids, with a grate, a toothed beam movable opposite thereto, and means to move said teeth in an endless path relative to said grate with a rising run and a falling run, in such a way that at the start of said falling run, said teeth perform a backward swinging to an unoperative position, and during the transition between the falling run and rising run, said teeth perform a further swinging in the same direction to a position wherein said teeth project anew through said grate.

13 Claims, 8 Drawing Figures

DEVICE FOR PURIFYING LIQUIDS, PARTICULARLY WATER

This invention relates to an improvement over my prior U.S. Pat. No. 3,615,012, issued Oct. 26, 1971, entitled "Device For Purifying Liquids, Particularly Water".

This invention relates to a device for purifying liquids, more particularly water, with a grate comprised of bars in parallel relationship with one another which can be arranged cross-wise in a liquid stream, with the grate top portion projecting out of said liquid up to a discharge chute or similar, whereby on the back side of the grate bars is mounted at least one toothed beam which extends substantially in parallel relationship with said grate at right angle to the lengthwise direction of the grate bars, and which drivably led in said lengthwise direction substantially over the whole grate height in a closed circle with a rising run and a falling run, in such a way that the teeth project through the grate bars during the rising run, and on at least one end of said beam lever means are provided with at least two discrete bearings, at least the one bearing lying outside the beam rotation axis, said bearings moving in two different guideways, said ways each having two approximately straight portions substantially in parallel relationship with said grate and two arc-shaped portions connecting said straight portions together to form two closed continuous ways, said guideways being so arranged relative to one another that the teeth undergo at the beginning of said falling run, a backwards swinging to an unoperative position over at least some determined distance of said falling run to then at the transition from the falling run to the rising run, perform from said back-swung position a further swinging in the same direction to a position wherein said teeth project anew during the rising run through said grate, whereby during said rising run, the one bearing leads relative to the other bearing and the conditions are reversed during the falling run, in such a way that said reversal occurs on the arc-shaped portions from said guideways.

The invention has mainly for object to provide a device wherein the swinging of said teeth between the rising and falling runs and between the falling and rising runs occurs uniformly without any danger of jamming and always according to a predetermined combination translation and rotation movement.

For this purpose, means are provided to always move both bearings together in the beam translation direction, during both said tooth swingings.

Usefully said means comprise a third bearing which acts on the beam during said swingings, at least on that moment where both said other bearings lie in a position on the respective guideways thereof where the tangents are substantially parallel to one another, in such a way that said beam rotation whereby that bearing lying outside the beam rotation axis would run back in the guideway thereof in said location, is opposed.

In a particular embodiment of the invention, said third bearing lies at a fixed spacing relative to the teeth and said bearing is retained in a discrete fixed guideway, at least in the transition from the falling run to the rising run of said beam and at least at that moment where both other bearings lie in a position of the respective guideways thereof where the tangents are substantially parallel.

Other details and features of the invention will stand out from the following description, given wy bay of non limitative example and with reference to the accompanying drawings, in which:

FIG. 2 shows on a larger scale, a cross-section along line II—II in FIG. 1, wherein however some components have been dispensed with.

FIG. 3 shows on a smaller scale, a cross-section along line III—III in FIG. 4, wherein the same components as in FIG. 2 have been dispensed with.

In the figures is shown a device for picking-up and removing solid impurities from water flowing inside a channel.

The device is essentially comprised of a grate 2 formed by bars 1 in parallel relationship with one another, said grate being arranged inside a channel 3 through which flows water along direction 8, of a discharge chute 4 and of two driven beams on shafts 5 and 6, on which teeth 7 are mounted.

Said grate 2 is made fast by the lowermost end thereof to the bottom 9 from channel 3 and it is bent backwards at the top, over a 180° angle, in such a way that it ends in the discharge chute 4 mounted above channel 3. Said grate 2 slants backwards and forms an angle of about 10° with the vertical.

Said shafts 5 and 6 extend from the back side of the grate 2 in parallel relationship therewith, along a direction at right angle to the lengthwise direction of bars 1. Each end of said shafts 5 and 6 is led by means of a running wheel 23 rotating freely on said ends, in a first closed guideway 10, which is comprised of two straight portions 11 and 12 in parallel relationship with bars 1, the corresponding ends of which are connected together by half-circle shaped portions 13 and 14. On each said ends of shafts 5 and 6 is mounted a lever 15 the axis of which forms a 90°-angle with the axis of shafts 5 and 6. To the free end of said lever 15 is fastened a running wheel 16 which is movable inside a second closed guideway 17, which is comprised of two straight portions 18 and 19 and two curved portions 29 and 30, which connect together the corresponding ends of said straight portions 18 and 19.

The corresponding ends of shafts 5 and 6 are connected together by an endless chain 20 which drives the shafts and moves same inside guideways 10, which are mounted on either side of said grate 2 inside boxes 21 which form an unit together with said grate 2. The chains 20 are comprised of two similar parts which connect together the corresponding ends of said shafts 5 and 6 and are supported at regular intervals by running wheels 22 which also move inside said guideways 10. Each chain 20 runs over two gear wheels 24 and 25 which lie on the back side of grate 2 adjacent the end thereof. The lowermost gear wheels 25 are freely rotatable while the uppermost gear wheels 24 which are mounted on one and the same shaft 32, are driven by a motor not shown which lies underneath the curved end of grate 2.

Each box 21 is comprised of two parts 26 and 27 which are adjustable relative to one another along the lengthwise direction of bars 1, said parts 26, 27 being telescoped into one another with the ends thereof facing one another. Inside part 26 is mounted gear wheel 24, while inside part 27 is arranged gear wheel 25, in such a way that due to moving said parts relative to one another, the spacing between gear wheels 24 and 25 is adjustable and the chain 20 can be tightened. The corresponding parts of said boxes 21 which lie on either side of grate 2, are connected together by crossbeams 28.

The straight portions 18 and 19 from guideway 17 lie in parallel relationship with straight portions 11 and 12 from guideway 10.

The spacing between portions 11 and 18 and the spacing between portions 12 and 19 is determined by the length of lever 15, in such a way that when the ends of a shaft 5 or 6 is being guided in portion 18, those teeth 7 made fast to the corresponding shaft, project between bars 1 from grate 2, in a position which lies substantially at right angle to said bars 1, and when the corresponding shaft is being guided in portion 12 from guideway 10, the teeth 7 lie substantially in parallel relationship with said portion. The course of said arc-shaped portions 29 and 30 from guideway 17 relative to the corresponding half-circle shaped portions 13 and 14 from guideway 10 is so designed as to have shafts 5 and 6 during the translation thereof over portions 13 and 14 performing simultaneously a rotation about the axis thereof, and the teeth 7 during the movement of shafts 5 and 6 over portion 13, swinging backwards over an angle of about 90° to a position in parallel relationship with the movement direction of chain 20 and during the movement of said shafts over portion 14, swinging frontwards on the inner side of said portion 14, over an angle of about 90° to a position at right angle to the bars 1 from grate 2.

Figure 5:
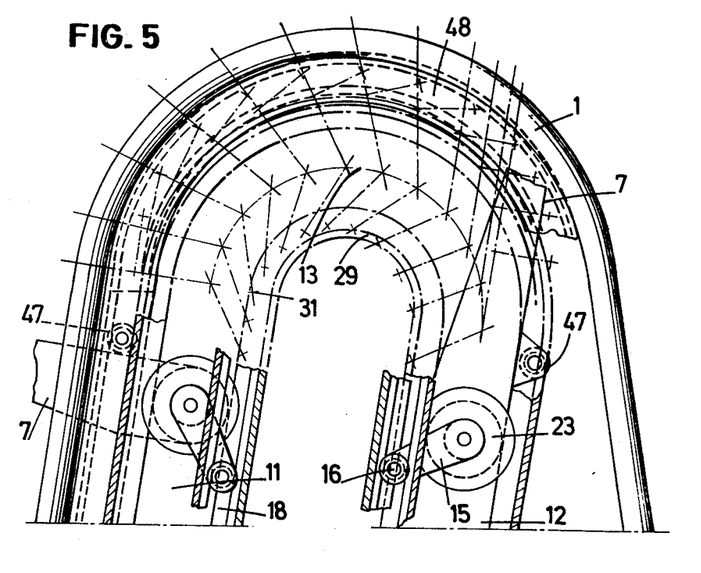
FIG. 5 shows a detail from the top part of the device according to the invention.
Figure 6:
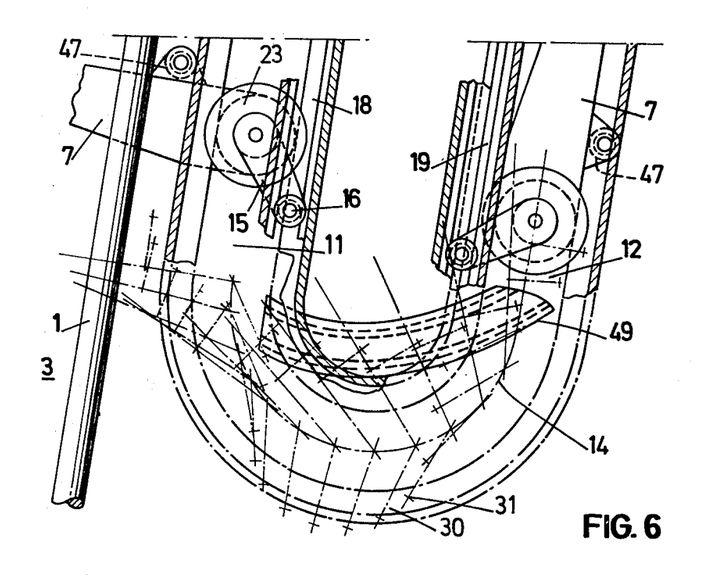
FIG. 6 shows a detail from the bottom part of the device according to the invention.

To obtain the above-described rotating of said shafts, the course of said arc-shaped portions 29 and 30 is designed in a kinematic way by bringing as shown in FIGS. 5 and 6, said teeth 7 in the various succeeding desired positions thereof during the movement of shafts 5 and 6 over the arc-shaped portions from guideway 10 and in each position, by showing by a point 31, the resulting following position of the axis from running wheel 16 which rotates freely on lever 15. The thus obtained points 31 make it possible to develop the curved portions 29 and 30 from guideway 17. The various intermediate positions of teeth 7, during the rotating thereof about the axis of shafts 5 and 6, are shown in FIGS. 5 and 6 but with the lengthwise axes of teeth 7 and lever 15, as said lengthwise axes on the one hand are enough to develop the course of portions 29 and 30 from guideway 17 and on ths other hand, as the FIGS. 5 and 6 lose thereby as little as possible in clearness.

As it may be derived from FIGS. 1 to 5, the running wheels 23 form bearings which lie on the rotation axis of beams 5 and 6, while running wheels 16 form bearings with a fixed spacing relative to running wheels 23 and lie outside the rotation axis of beams 5 and 6.

It thus appears that should but both said bearings be provided, during the transition between the rising and falling runs on the one hand, and the falling and rising runs on the other hand, of beams 5 and 6, in other words during the swinging motions of teeth 7, said teeth at some particular moment would generally no more perform the above-described movements but rather either under the pressure from the flowing water or under the action of the force of gravity, would rotate in an uncontrolled way and be brought to such a position that the whole unit would jam.

Figure 7:
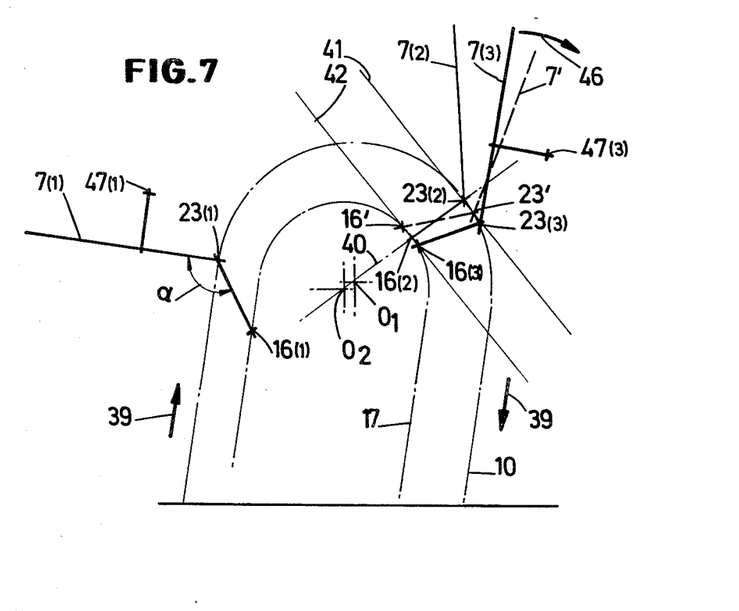
FIG. 7 is a simplified kinematic showing of the top part from the device according to FIG. 5.
Figure 8:
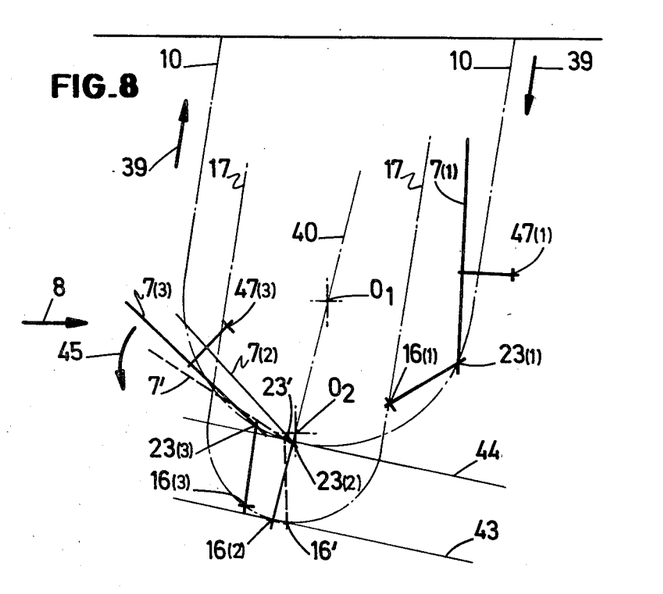
FIG. 8 is a simplified kinematic showing of the bottom part from the device as shown in FIG. 6.

The cause of said phenomenon is clearly shown in FIGS. 7 and 8 wherein said teeth 7, lever 15 and guideways 10 and 17 are shown diagrammatically with the axes thereof, while both bearings or running wheels 16 and 23 are shown as a point on said guideways.

Points 16 in FIGS. 7 and 8 thus correspond actually with points 31 in FIG. 6.

In said FIGS. 7 and 8 have been shown various succeeding typical positions of teeth 7 and bearings 16 and 23 at the level of said arc-shaped portions from guideways 10 and 17.

FIG. 7 shows the uppermost arc-shaped portions, while FIG. 8 shows the lowermost arc-shaped portions. $0_1$ and $0_2$ are the centers of curvature for the arc-shaped portions from guideway 10 and guideway 17 respectively.

In both said figures moreover, 7(1), 16(1) and 23(1) show the position of teeth 7 and corresponding bearings 16 and 23 before reaching said arc-shaped portions.

References 7(2), 16(2) and 23(2) show the critical position of beam 6. At this moment the bearings 16(2) and 23(2) lie on the straight line said centers of curvature $0_1$ and $0_2$ lie on. In this location, the tangents 41 and 42 as well as the tangents 43 and 44 to guideways 10 and 17 respectively lie in parallel relationship two by two and the spacing between guideways 10 and 17 is equal to the spacing between bearings 16 and 23.

Should now no additional means be provided, said bearing 16 might during the further movement of bearing 23 in the direction of arrow 39 under the action of chain 25, suddenly run back on guideway 17 thereof in the direction opposite to arrows 39, under the action of the force of gravity influencing said teeth 7. In this location said beam 6 may always undergo a free rotation about the axis thereof, under the action of the weight of said teeth 7, as shown by arrow 46 in FIG. 7 and arrow 45 in FIG. 8.

This results in said teeth 7 and bearings 16 and 23 taking a position as shown by reference numerals 7', 16' and 23' and said teeth then fall further down due to a further movement of bearing 23 in the direction of arrows 39 which results in a running back of bearing 16 over guideway 17 thereof and jamming of the complete mechanism.

Another wrong movement of teeth 7 may occur under the action of the pressure from the water flowing along the direction of arrow 8, over the lowermost arc-shaped portions from said guideways 10 and 17 as a result of the required play which is always provided between running wheels 16 and 23 and the respective guideways 17 and 10 thereof. Due to the horizontal pressure thus exerted on said teeth 7 at the moment where said bearings take positions 16(2) and 23(2) respectively, said teeth might be raised and undergo too far a rotation about the axis of beam 6 in the direction opposite to arrow 45, to take an upstanding position which results again in jamming of the mechanism.

According to the invention, said drawbacks are obviated by providing additional guide or support means to always cause during the swinging motions of said teeth above and below said grate, both bearings 16 and 23 to move in the translation direction of beam 6 as shown by arrows 39.

In the embodiment as shown in the accompanying figures, said means comprise a third bearing 47 which acts during said swinging motions, at least at that moment where both other bearings 16 and 23 lie in positions 16(2) and 23(2), on beam 6 in such a way that rotating thereof which would cause said bearing 16 to run back in the guideway 17 thereof, is opposed.

Said third bearing 47 is retained in a discrete guideway 48 at the top and a discrete guideway 49 at the bottom, at least at that moment where both other bearings 16 and 23 lie in that location of the respective guideways 10 and 17 thereof where the tangents 41, 42 and 43, 44 respectively lie in parallel relationship two by two as shown in FIGS. 7 and 8.

Figure 4:
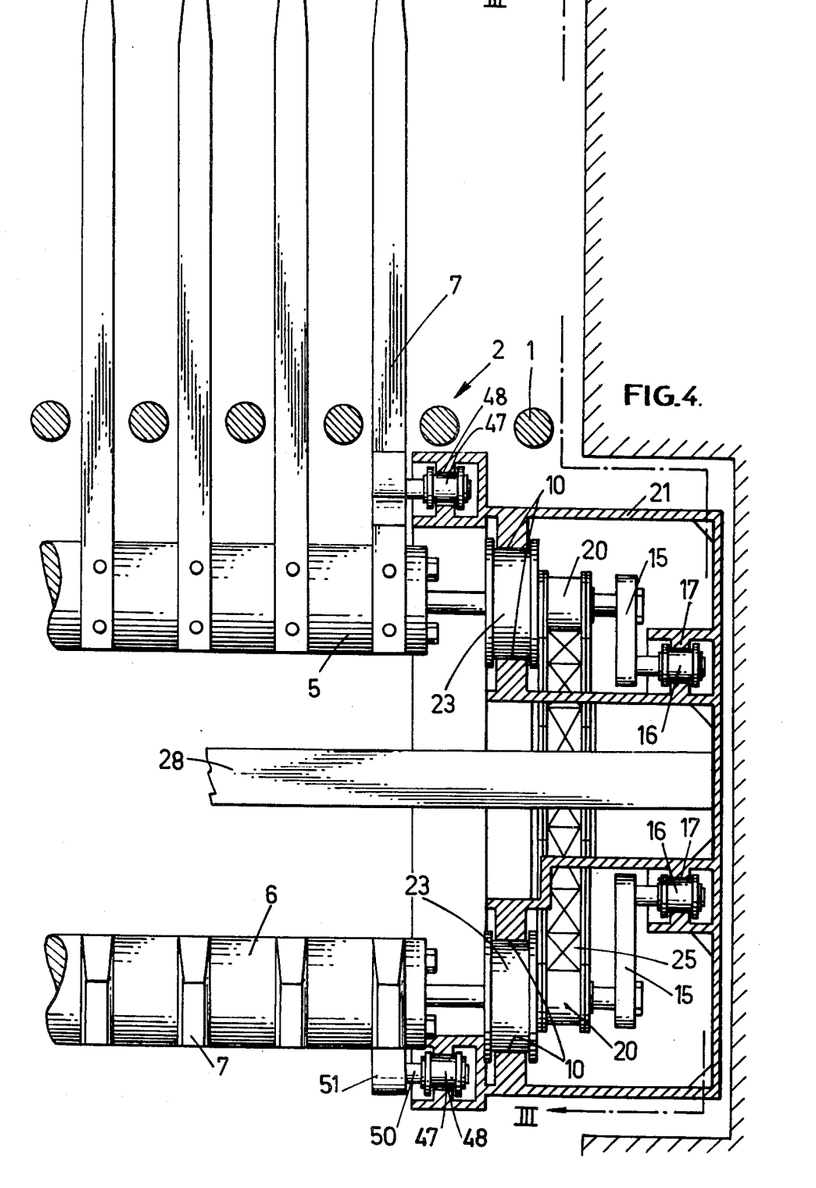
FIG. 4 shows on a larger scale, a part cross-section along line V—V in FIG. 2.

Said bearing 47 is also formed by a running wheel, as shown in FIGS. 4 to 6.

Said bearing 47 lies both outside the axis of beam 6 and outside an axis in parallel relationship thereto whereon said bearing 16 lies, that is in the embodiment as shown in the figures, outside the rotation axes of running wheels 16 and 23.

The running wheel 47 is rotatably mounted on a shaft 50 the free end of which is mounted in a pedestal bearing 51 which is made fast to that tooth 7 nearest the end of beam 6.

In the same way as for running wheels 16 and 23, the guideways 48 and 49 from running wheel 47 are formed by grooves which have the form of an arc of circle at the transition between the rising and falling runs of beam 6, and at the transition between the falling and rising runs thereof respectively.

As already mentioned regarding FIGS. 7 and 8, the spacing between the arc-shaped portions from guideways 10 and 17 in that plane which comprises the centers of curvature $0_1$ and $0_2$ of these portions and which lies in parallel relationship with the axis of beam 6, is substantially equal to the spacing between the axes of running wheels 16 and 23.

The width of said grooves is somewhat wider than the diameter of the wheels running therein to let said wheels roll on the groove walls during the movement of beam 6.

It must finally be mentioned that the dihedral angle formed between that plane which comprises the axis of beam 6 and is substantially in parallel relationship with the axis of teeth 7, and that plane which comprises the beam bearing and said bearing lying outside said axis, reaches preferably about 120°. Said angle is shown by reference $\alpha$ in FIG. 7.

Figure 1:
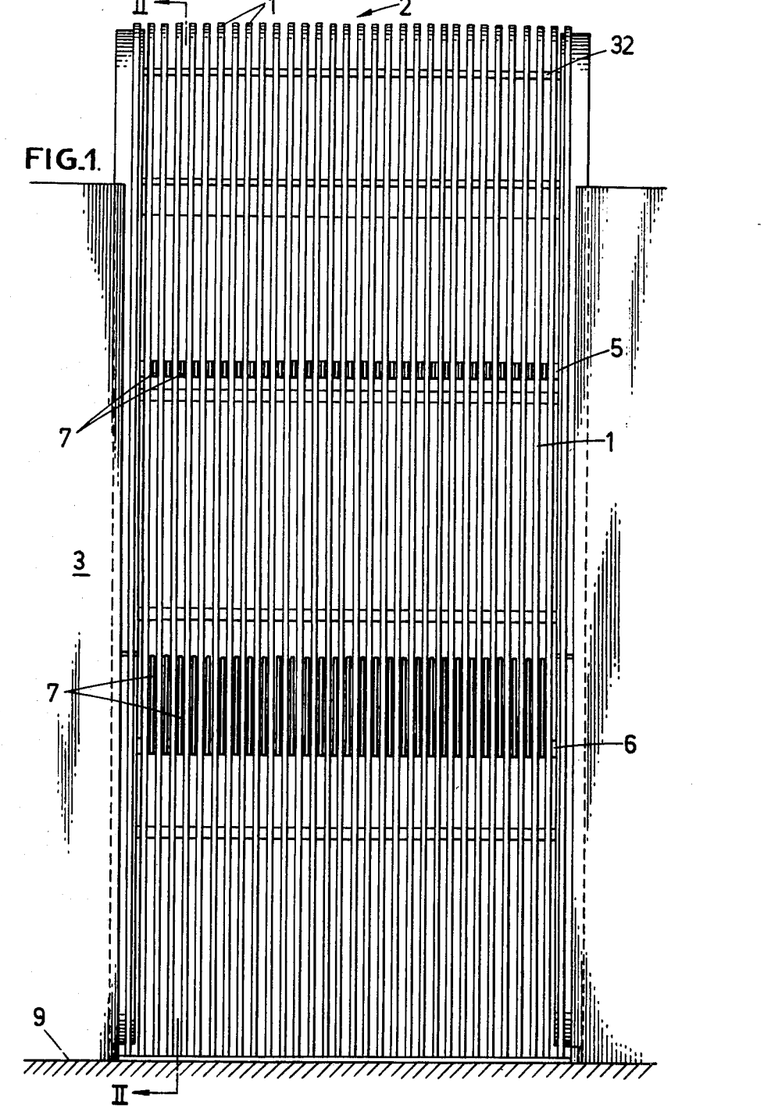
FIG. 1 is a front view of a device according to the invention.
Figure 2:
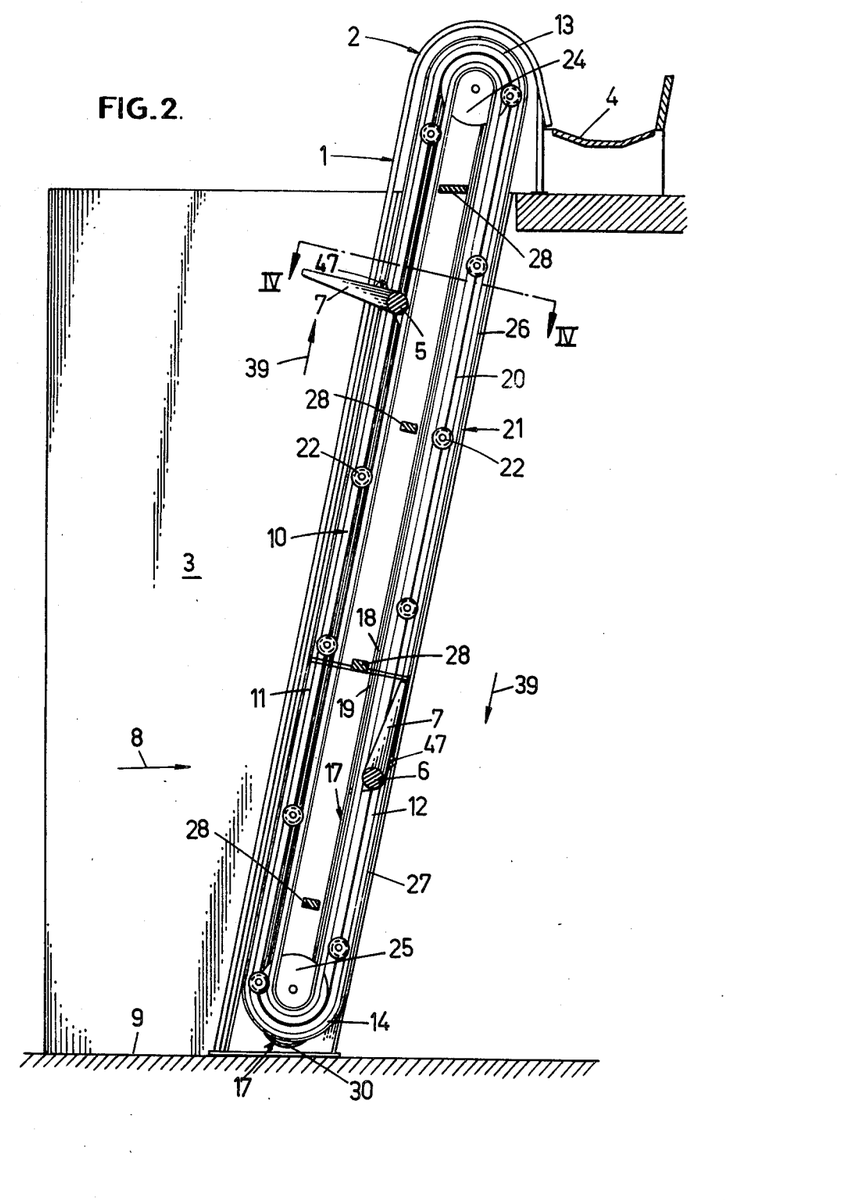
Figure 3:
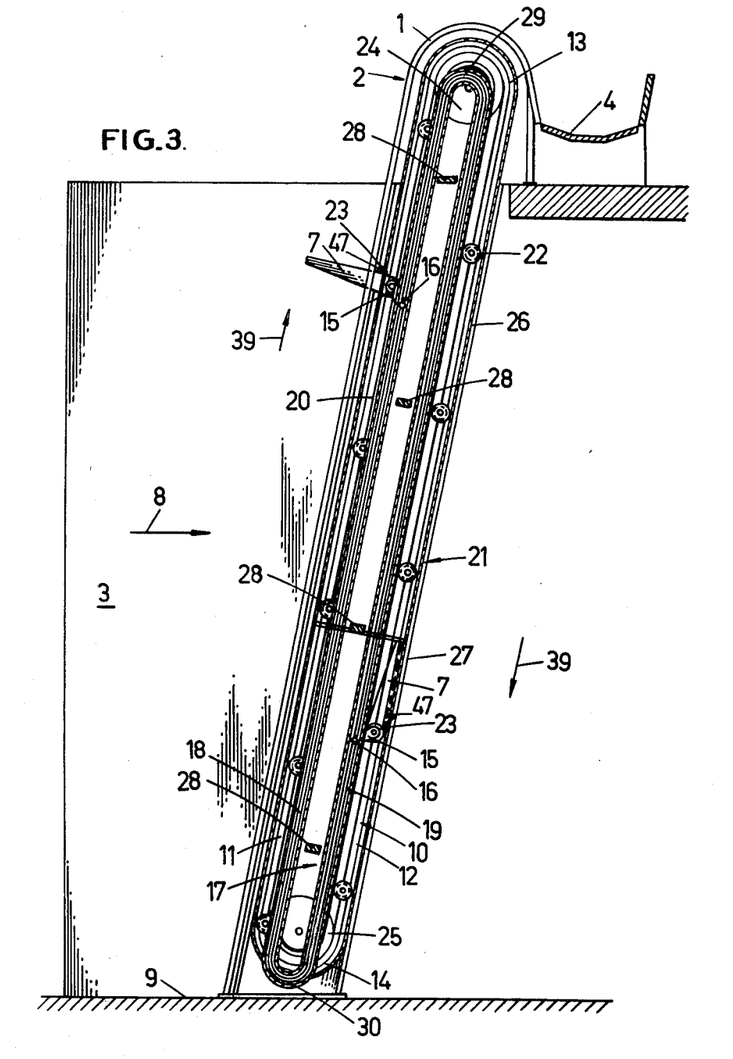

Said guideways 48 and 49 have not been shown in FIGS. 2 and 3 for clearness sake.

Said guideways may be limited to a portion from the transition between the straight run of beam 6, or may possibly extend over some determined distance along said straight run.

The working of the above-described device according to the invention is as follows:

Both chains 20 and consequently the shafts 5 and 6 mounted thereon are continuously driven in the direction shown by arrow 39. The teeth 7 are tilted forward at the bottom of grate 2 to project through said grate 2 and carry along during the upwards movement thereof, the solid constituents which are retained by said grate 2. Said constituents are raised out of the water and moved over the curved end of grate 2 to be discharged in said discharge chute.

Said teeth 7 are tilted backward in the described way during the movement thereof between the top ends bent over 180°, of bars 1 from grate 2, in such a way that the angle the front side of said teeth 7 forms with the tangent plane on the cylinder surface which is determined by the lengthwise axes of the bent bars, in the line of intersection of said surface with that plane which is determined by the lengthwise axes of said bent bars, is never smaller than 90° in such a way that the raised constituents may never jam between said teeth 7 and grate 2. After discharging of the solid constituents in said discharge chute by the teeth 7, said teeth slide completely out said bars 1 to a backward-swung position, along the movement direction of that shaft they are mounted on, and said teeth 7 move in such unoperative position, to underneath grate 2 where they undergo a frontward-swinging to a position at right angle to said grate, whereby a new cycle thus begins.

Due to the presence of said running wheel 47 guided in a fixed guideway 48 or 49 in the abovedescribed critical locations of the curved portion from guideways 10 and 17, the motion of teeth 7 is completely controlled and occurs as shown in dashed lines in FIGS. 5 and 6.

The device according to the invention has the advantage that the complete driving and moving mechanism is built completely behind the grate, without any moving member projecting outside or above said grate.

While in the described device, the number of shafts has been limited to two, the usefulness thereof may be increased by arranging a plurality of toothed shafts at regular intervals.

The moving members of the device, such as the toothed shafts and chains, all lie in easy reach above the water level for the maintenance thereof and possibly repairing thereof.

It must be understood that the invention is in no way limited to the above embodiments and that many changes may be brought therein without departing from the scope of the invention as defined by the appended claims.

I claim:

1. Device for purifying liquids, more particularly water, with a grate comprised of bars in parallel relationship with one another which can be arranged crosswise in a liquid stream, with the grate top portion projecting out of said liquid up to a discharge chute or similar, wherein on the back side of the grate bars is mounted at least one toothed beam which extends substantially in parallel relationship with said grate at right angle to the lengthwise direction of the grate bars, and which is drivably led in said lengthwise direction substantially over the whole grate height in a closed circle with a rising run and a falling run, in such a way that the teeth project through the grate bars during the rising run, and on at least one end of said beam lever means are provided with at least two discrete bearings, at least the one bearing lying outside the beam rotation axis, said bearings moving in two different guideways, said ways each having two approximately straight portions substantially in parallel relationship with said grate and two arc-shaped portions connecting said straight portions together to form two closed continuous ways, said guideways being so arranged relative to one another that the teeth undergo at the beginning of said falling run, a backwards swinging to an inoperative position over at least some determined distance of said falling run to then at the transition from the falling run to the rising run, and undergo a further swinging from said inoperative position in the same direction to an operative position wherein said teeth project anew during the rising run through said grate, whereby during said rising run, the one bearing leads relative to the other bearing and the conditions are reversed during the falling run, in such a way that said reversal occurs on the arc-shaped portions of said guideways, and antijamming means for always moving both bearings together in the balk translation direction to prevent jamming of said bearing during both said tooth swingings as said bearing moves in said closed circle.

2. Device as defined in claim 1, in which said antijamming means comprise a third bearing which acts on the beam during said swingings, at least on that moment where both said other bearings lie in a position on the respective guideways thereof where the tangents are substantially parallel to one another, in such a way that said beam rotation whereby that bearing lying outside the beam rotation axis would run back in the guideway thereof in said location, is opposed.

3. Device as defined in claim 2, in which said third bearing lies at a fixed spacing relative to the teeth and said bearing is retained in a discrete fixed guideway, at least in the transition from the falling run to the rising run of said beam and at least at that moment where both other bearings lie in a position of the respective guideways thereof where the tangents are substantially parallel.

4. Device as defined in claim 3, in which said third bearing is also retained during the transition from the rising run to the falling run, in a discrete fixed guideway, at least at that moment where both other bearings lie in a location on the respective guideways thereof where the tangents lie substantially in parallel relationship.

5. Device as defined in claim 2, in which said bearings are formed by running wheels which rotate freely about axes in parallel relationship with said beam.

6. Device as defined in claim 5, in which said third bearing is mounted on that tooth nearest the beam end.

7. Device as defined in claim 2, in which the one bearing lies on the beam axis, while said other bearing arranged outside said axis lies on a lever which is fast relative to said beam, and said third bearing lies outside the beam axis as well as outside an axis in parallel relationship therewith on which lies said other bearing.

8. Device as defined in claim 2, in which said arc-shaped portions from the guideways for said two first-mentioned bearings as well as the guideways for the third bearing are formed by a groove, said grooves being in the shape of an arc of circle whereby the spacing between the arc-shaped portions from the guideways for said first two bearings in that plane which comprises the centers of curvature of said portions and which lies in parallel relationship with the beam axis, is substantially equal to the spacing between both said bearings.

9. Device as defined in claim 8, in which the width of said grooves is somewhat wider than the diameter of the running wheels movable therein, to let said wheels roll on the groove walls during the moving of the beam.

10. Device as defined in claim 2, in which said three bearings are provided at both ends of said beam.

11. Device as defined in claim 1, in which each one of the beam ends is hingedly fastened to a driven endless chain which runs over two gear wheels which lie on either side of the grate bars.

12. Device as defined in claim 1, in which the dihedral angle formed between that plane which comprises the beam axis and lies substantially in parallel relationship with the tooth axis, and that plane which comprises the beam axis and said bearing lying outside said axis, reaches about 120°.

13. Device for purifying liquids, more particularly water, with a grate comprised of bars in parallel relationship with one another which can be arranged crosswise in a liquid stream, with the grate top portion projecting out of said liquid up to a discharge chute or similar, wherein on the back side of the grate bars is mounted at least one toothed beam which extends substantially in parallel relationship with said grate at right angle to the lengthwise direction of the grate bars, and which is drivably led in said lengthwise direction substantially over the whole grate height in a closed circuit with a rising run and a falling run, in such a way that the teeth project through the grate bars during the rising run, and on at least one end of said beam lever means are provided with at least two discrete bearings, at least the one bearing lying outside the beam rotation axis, said bearings moving in two different guideways, said ways each having two approximately straight portions, substantially in parallel relationship with said grate and two portions in the shape of an arc of circle connecting said straight portions together to form two closed continuous ways, said guideway being formed by grooves so arranged relative to one another that the teeth undergo at the beginning of said falling run, a backwards swinging to an inoperative position over at least some determined distance of said falling run to then at the transition from the falling run to the rising run, and undergo a further swinging in the same direction to a position wherein said teeth project anew during the rising run through said grate, whereby during said rising run, the one bearing leads relative to the other bearing and the conditions are reversed during the falling run, in such a way that said reversal occurs on the arc-shaped portions from said guideways, in which device means are provided, to always move both bearings together in the balk translation direction during both said tooth swingings comprising a third discrete bearing located outside the beam axis as well as outside an axis in parallel relationship therewith on which lies the bearing, situated outside the beam rotation axis, at a fixed spacing relative to the teeth, said third bearing being also retained in a groove at least on that moment where both said other bearings lie in a position on the respective guideways thereof where the tangents are substantially parallel to one another.

* * * * *